Figure 1:
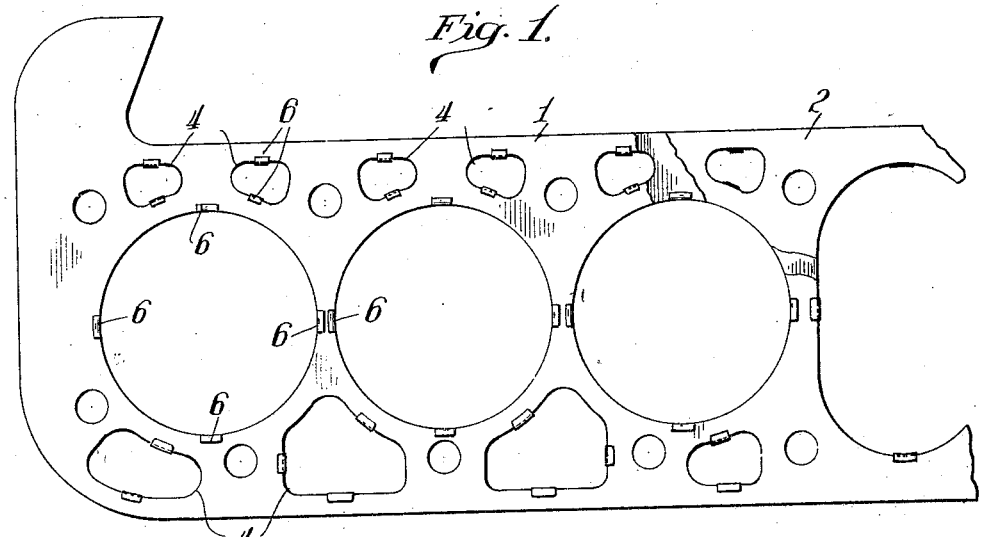

April 12, 1932.  F. J. OVEN  1,853,175
GASKET
Filed July 19, 1926

Inventor
Frank J. Oven
By Daniel F Brennan
Attorney

Patented Apr. 12, 1932

1,853,175

UNITED STATES PATENT OFFICE

FRANK J. OVEN, OF CHICAGO, ILLINOIS, ASSIGNOR TO VICTOR MANUFACTURING & GASKET CO., A CORPORATION OF ILLINOIS

GASKET

Application filed July 19, 1926. Serial No. 123,437.

This invention relates to improvements in gaskets and particularly to gaskets of the type in use in steam engines, combustion engines, pumps and the like, said gaskets comprising one or more layers of thin metal associated with one or more layers of heat proof material.

While in known gaskets of this character the marginal portions of at least one layer of the sheet metal were bent over their entire length to embrace marginal portions of the companion layer or layers, it is an object of the present invention to simplify the construction of these gaskets by combining ordinary metal shims with a layer or layers of the heat proof material without requiring a bending or pressing treatment of the marginal portions of the sheet metal over their entire length.

It is also an object of the invention to provide a gasket the thickness of which may readily be varied by the addition or removal of one or more shims of the required shape. In this manner it is feasible to build up a gasket of the required thickness, and to reduce the cost for the maintenance of engines, and the invention provides the possibility of varying the thickness of gaskets, while heretofore a gasket of insufficient or excessive thickness had to be thrown away and had to be replaced by a complete entirely different gasket.

With these and other objects in view, embodiments of the invention are illustrated in the accompanying drawings to which reference is made in the following specification.

In the drawings:

Fig. 1 is a top plan view of a portion of a gasket in connection with a cylinder block casting; certain portions being shown broken away.

Figure 2:
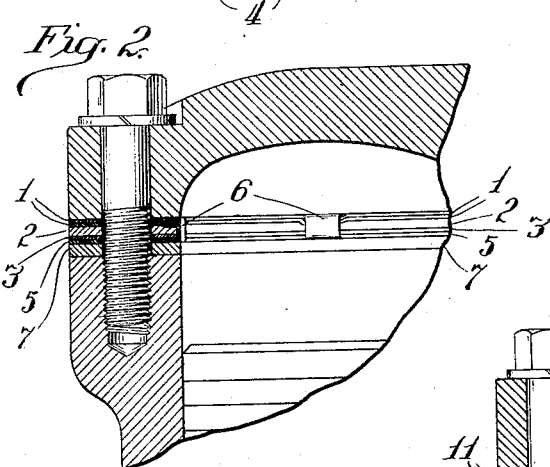
Figure 3:
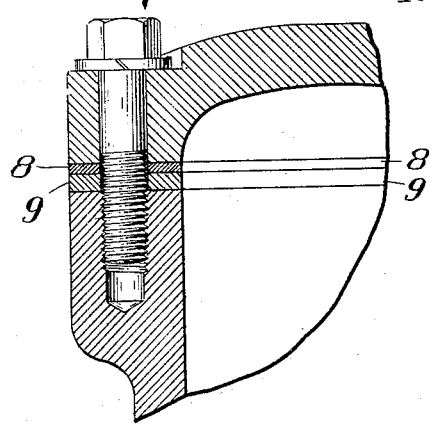
Figure 4:
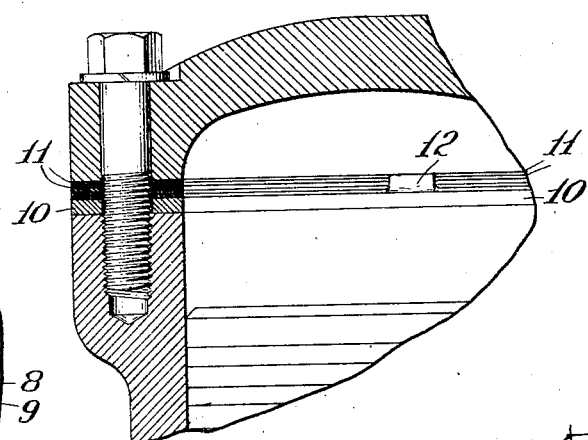

Figs. 2, 3, and 4 are enlarged fragmentary sectional views of gaskets in combination with portions of engine cylinders.

In the gaskets in general use, particularly in gaskets for pumps, combustion engines, etc., the packing means inserted between parts to be united are formed of outer layers of sheet metal and one or more inner layers of flexible fireproof material, as for instance sheet asbestos or a composition containing asbestos. The metal layers and the layer of asbestos were held in assembled relation by shaping marginal projecting portions of one of the sheets of metal so as to embrace the marginal portion of the entire gasket. In other constructions special rims or other confining members embracing the marginal portions of the structure were applied and were bent against the upper and lower surface of the gasket. The latter then formed a self contained structure composed of a plurality of flat members united either by marginal bent-over flanges which extended over the inner and outer circumference of the gasket, or were united by a special rim member of channel shaped cross section.

In contrast to this prior practice, the present invention provides a packing means in which individual shims of metal of any desired or required number are combined with the desired number or thickness of flexible heat proof material, the parts being cut or stamped of the desired outline so as to provide one or more openings, the structure being devoid of any special means for uniting the parts over the entire contour or a large portion of the same.

In the embodiment illustrated in Figs. 1 and 2, shims 1 are arranged in superposed relation in registry with each other above a disc or plate 2 of suitable flexible fireproof material which may be made of asbestos or a composition containing asbestos. Another shim 3 of exactly the same shape in outline and with similar openings 4 as the upper shims is placed against the under face of the layer of asbestos, and this assembly of shims and asbestos is then reinforced by an additional shim 5 also having the same contour as the other shims but being provided with a plurality of tongues 6 of relatively small width projecting from the shim 5 inward towards the area of the openings and bent over to embrace relatively narrow edge portions of the other shims 1 and 3, and of the layer 2, whereby the entire structure is maintained assembled in proper registered relation without requiring the application of any additional holding means around the outer edge of the same. If, in the operation of the device it should be shown that the height of the gasket is not sufficient, one or more tin shims 1 of the same outline may be added and may either be combined with the structure shown in Fig. 1 by opening the bent over prongs 6 and reclosing the same over the added layer of metal, or by simply placing a shim on top of this structure without securing it to the latter by the prongs or in any other way. Fig. 1 also illustrates another layer of asbestos 7 placed beneath the assembled structure, to complete the same to the desired thickness.

While, according to the embodiment illustrated in Figs. 1 and 2, a layer of heatproof flexible material as asbestos is inserted between a plurality of layers of metal, the modification shown in Fig. 3 comprises a single relatively narrow but thick plates 8, of metal, as for instance copper which acts as a shim in combination with a single also relatively strong layer 9 of asbestos which is interposed between the top of the cylinder wall and the head of the cylinder. Here also, any desired addition to the thickness of the gasket may be accomplished by placing another shim of a weaker gauge on top of the copper plate 8, or if the gasket should be too thick, the copper plate 8 illustrated may be removed, and another plate of identical outline but of lighter gauge may be substituted.

As in the first described embodiment of the invention, the outer edge of the assembled gasket structure, formed by the disc or plate of metal and the layer of asbestos, is unconfined; and here also the inner edge is entirely unconfined to facilitate the removal or replacement of the parts of which the structure is composed.

While in the embodiment shown in Figs. 1 and 2 a layer of heatproof flexible material, as asbestos, is introduced between two or more layers of light gauge metal without their being fixedly connected to each other, in the modification show in Fig. 4, the gasket is composed of a relatively heavy layer 10 of asbestos or similar heatproof material over which a plurality of foils or shims 11 is arranged. These shims placed in superposed relation with respect to each other and to the layer 10 of asbestos may then again be held together by means of prongs 12 bent from one of these shims and adapted to embrace relatively narrow marginal portions of the entire set of shims to facilitate the assembly and the removal of one or more of them and to vary thereby the thickness of the entire gasket.

In all of these embodiments the operation of finishing a strip of metal to the required length and bending said strip of metal to overlie an entire edge portion of the gasket an upper and lower marginal portions of the individual members of the same is eliminated to induce thereby considerable saving in the manufacture and greater flexibility in the maintenance of the entire structure.

I claim:

A cylinder head gasket comprising a plurality of shims having a plurality of combustion, water and bolt openings therein, said shims being superimposed one upon the other in registration, and a plurality of spaced prongs formed on the edges of one outer shim, said prongs extending closely across the edges of the other shims and the free ends of the prongs being bent over and clamped upon the other outer shim to secure the shims in a unitary assembly but adapted to be unclamped to permit removal or addition of a shim.

In testimony whereof I affix my signature at 10 S. La Salle St., Otis Bldg, Chicago, Ill.

FRANK J. OVEN.